US012763426B2

(12) United States Patent
Jeon et al.

(10) Patent No.: US 12,763,426 B2
(45) Date of Patent: Oct. 13, 2026

(54) BATTERY MODULE AND BATTERY PACK

(71) Applicant: SK On Co., Ltd., Seoul (KR)

(72) Inventors: Hae Ryong Jeon, Daejeon (KR); Seo Roh Rhee, Daejeon (KR); Tae Il Kim, Daejeon (KR); Dong Ha Hwang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 22 days.

(21) Appl. No.: 17/742,919

(22) Filed: May 12, 2022

(65) Prior Publication Data

US 2022/0367969 A1 Nov. 17, 2022

(30) Foreign Application Priority Data

May 14, 2021 (KR) ........................ 10-2021-0062615

(51) Int. Cl.
*H01M 50/367* (2021.01)
*H01M 10/658* (2014.01)

(52) U.S. Cl.
CPC ....... *H01M 50/367* (2021.01); *H01M 10/658* (2015.04)

(58) Field of Classification Search
CPC ............... H01M 50/24; H01M 50/367; H01M 50/375–394; H01M 10/651; H01M 10/653; H01M 2220/20; H01M 50/583; H01M 50/211; H01M 50/204; H01M 50/271; H01M 50/3425; H01M 50/244; H01M 2220/00; H01M 10/647; H01M 50/383; H01M 50/20; H01M 50/105; H01M 50/30–394; H01M 50/548; H01M 50/207; H01M 10/65–658; Y02E 60/10; Y02P 70/50; A62C 3/0257; A62C 3/16; A62C 37/11; A62C 2/00–10; A62C 4/00–04; A62C 99/00–009; B60L 50/64; B60L 2270/12; H05K 5/0213; A62D 1/00–06

See application file for complete search history.

(56) References Cited

U.S. PATENT DOCUMENTS 4,180,177 A * 12/1979 Gunderman ............. H05K 5/04 220/88.1
11,139,524 B2 10/2021 Sugeno
(Continued)

FOREIGN PATENT DOCUMENTS

CN 209183604 U 7/2019
CN 112310552 A * 2/2021 .......... H01M 10/613
(Continued)

OTHER PUBLICATIONS

CN-112310552-A—English Translation—Accessed Oct. 12, 2023 (Year: 2021).*
(Continued)

*Primary Examiner* — Allison Bourke
*Assistant Examiner* — Bethany C Garcia
(74) *Attorney, Agent, or Firm* — IP&T GROUP LLP

(57) ABSTRACT

Provided is a battery module including a case, a plurality of battery cells accommodated in the case, and a flame blocking member including a plurality of exhaust passages connecting an inside and an outside of the case together, and a partition wall part disposed between the plurality of exhaust passages.

18 Claims, 9 Drawing Sheets

(56) References Cited

U.S. PATENT DOCUMENTS

| | | | | |
|---|---|---|---|---|
| 2004/0009386 | A1* | 1/2004 | Nygren | H01M 8/0232 429/534 |
| 2015/0147605 | A1 | 5/2015 | Kim et al. | |
| 2015/0229010 | A1* | 8/2015 | Ahn | H01M 50/289 429/120 |
| 2017/0033343 | A1* | 2/2017 | Miyawaki | H01M 50/30 |
| 2019/0097192 | A1 | 3/2019 | Kim et al. | |
| 2019/0334143 | A1* | 10/2019 | Sugeno | H01M 50/276 |
| 2020/0076025 | A1* | 3/2020 | Jo | H01M 50/271 |
| 2021/0104798 | A1 | 4/2021 | Jiang et al. | |
| 2022/0115736 | A1* | 4/2022 | Oh | H01M 50/548 |
| 2022/0140432 | A1* | 5/2022 | Chen | H01M 50/209 429/53 |

FOREIGN PATENT DOCUMENTS

| | | | | |
|---|---|---|---|---|
| JP | 6631726 | B2 | 12/2019 | |
| KR | 101026745 | B1 * | 4/2011 | H01M 2220/20 |
| KR | 10-2015-0061200 | A | 6/2015 | |
| KR | 10-2017-0014309 | A | 2/2017 | |
| KR | 10-2019-0036260 | A | 4/2019 | |
| KR | 20190122474 | A * | 10/2019 | H01M 50/35 |

OTHER PUBLICATIONS

KR-20190122474-A—English Translation—Accessed Oct. 12, 2023 (Year: 2019).*

Franssen et al., "Fire Design of Steel Structures—Annex A: Thermal Data for Carbon Steel and Stainless Steel Sections," 2010, p. 319-345. (Year: 2010).*

KR-101026745-B1—English translation via Espacenet, accessed Dec. 18, 2024 (Year: 2024).*

Office Action for Korean Patent Application No. 10-2021-0062615 issued by the Korean Patent Office on May 15, 2025.

Office Action for Korean Patent Application No. 10-2021-0062615 issued by the Korean Patent Office on Feb. 23, 2026.

* cited by examiner

BATTERY MODULE AND BATTERY PACK

CROSS-REFERENCE TO RELATED APPLICATION(S)

This application claims benefit of priority to Korean Patent Application No. 10-2021-0062615 filed on May 14, 2021 in the Korean Intellectual Property Office, the disclosure of which is incorporated herein by reference in its entirety.

BACKGROUND

1. Field

The present disclosure relates to a battery module and a battery pack. More particularly, the present disclosure relates to a method of improving safety of a battery module or a battery pack.

2. Description of Related Art

Currently commercialized secondary batteries include nickel-cadmium batteries, nickel-hydrogen batteries, nickel-zinc batteries, lithium secondary batteries, and the like. Thereamong, lithium secondary batteries have almost no memory effect, as compared to nickel-based secondary batteries, and thus, may be freely charged and discharged and have a very low self-discharge rate and a high energy density. Accordingly, lithium secondary batteries are currently in the spotlight.

Such lithium secondary batteries mainly use lithium-based oxides and carbon materials as cathode active materials and anode active materials, respectively. The lithium secondary batteries include an electrode assembly in which a cathode plate and an anode plate to which the cathode active material and the anode active material are applied, respectively, are disposed with a separator interposed therebetween, and a casing for sealing and accommodating the electrode assembly together with an electrolyte, that is, a battery pouch casing.

Recently, secondary batteries have been widely used not only in small devices such as portable electronic devices, but also in medium-large devices such as automobiles and power storage devices. When used in such medium-large devices, a large number of secondary batteries are electrically connected to increase capacity and output. In particular, a pouch-type secondary battery is widely used in such a medium-large device due to the advantage of easy stacking.

Meanwhile, in recent years, as the need for a large-capacity structure including use as an energy storage source increase, there is increasing demand for a plurality of secondary batteries electrically connected in series and/or parallel and a battery pack including a battery module having secondary batteries accommodated therein and a battery management system (BMS).

The battery pack or battery rack includes a plurality of battery modules, and when thermal runaway occurs in the plurality of secondary batteries of each battery module, and thus, the secondary batteries are ignited and exploded, heat or flames may be transferred to adjacent secondary batteries, and thus, a secondary explosion or the like may occur. Accordingly, efforts are being made to prevent secondary ignition or explosions.

SUMMARY

An aspect of the present disclosure may prevent flame or high-temperature gas generated inside a battery module from being ejected to an outside of the battery module or to minimize the ejection of the flame or high-temperature gas.

Another aspect of the present disclosure may prevent flame or high-temperature gas generated inside a battery pack from being ejected to an outside of the battery pack or to minimize the ejection of the flame or high-temperature gas.

According to still another aspect of the present disclosure, a battery module may include a case, a plurality of battery cells accommodated in the case, and a flame blocking member including a plurality of exhaust passages connecting an inside and an outside of the case together, and a partition wall part disposed between the plurality of exhaust passages.

The flame blocking member may have a thickness in a first direction, and the plurality of exhaust passages and the partition wall part may extend in the first direction.

The flame blocking member may include sheet members having a corrugated form, and the plurality of exhaust passages may be defined by spaces formed between the sheet members.

The flame blocking member may have a shape in which a first sheet member and a second sheet member disposed on the first sheet member are wound, and the plurality of exhaust passages may include spaces formed between the first sheet member and the second sheet member, and the partition wall part may include the first sheet member and the second sheet member.

The first sheet member may be flat, and the second sheet member may include a plurality of uneven portions.

The second sheet member may have a form in which a plurality of valleys and a plurality of ridges are alternately arranged.

The plurality of battery cells may include electrode leads drawn out in one direction, and the flame blocking member may be disposed in a portion facing the electrode leads in the case.

The flame blocking member may include irregular holes, and the irregular holes may constitute at least a portion of the plurality of exhaust passages.

The flame blocking member may include a material having a thermal conductivity of 5 W/mK or more.

According to yet another aspect of the present disclosure, a battery pack may include: a case; a plurality of battery modules accommodated in the case; and a flame blocking member including a plurality of exhaust passages connecting an inside and an outside of the case together, and a partition wall part disposed between the plurality of exhaust passages.

The flame blocking member may have a thickness in a first direction, and the plurality of exhaust passages and the partition wall part may extend in the first direction.

The flame blocking member may include sheet members having a corrugated form, and the plurality of exhaust passages may be defined by spaces formed between the sheet members.

The flame blocking member may have a shape in which a first sheet member and a second sheet member disposed on the first sheet member are wound, and the plurality of exhaust passages may include spaces formed between the first sheet member and the second sheet member, and the partition wall part may include the first sheet member and the second sheet member.

The first sheet member may be flat, and the second sheet member may include a plurality of uneven portions.

The second sheet member may have a form in which a plurality of valleys and a plurality of ridges are alternately arranged.

The case may include a vent hole connecting the inside and outside of the case, and the flame blocking member may be disposed inside or on one side of the vent hole.

A flow path connected to the vent hole may be formed inside the case, and the flame blocking member may be disposed on at least one location on the flow path.

The flame blocking member may include irregular holes, and the irregular holes may constitute at least a portion of the plurality of exhaust passages.

The flame blocking member may include a material having a thermal conductivity of 5 W/mK or more.

According to yet another aspect of the present disclosure, a flame blocking member panel for installing in a battery module, comprising: plural flame blocking members distributed across the panel and each of the flame blocking members having, a partition wall part having an outside shape conformed to an opening which vents flame gas from the battery module when a battery in the battery module catches fire and a plurality of exhaust passages in the partition wall part extending longitudinally and completely through the partition wall part.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
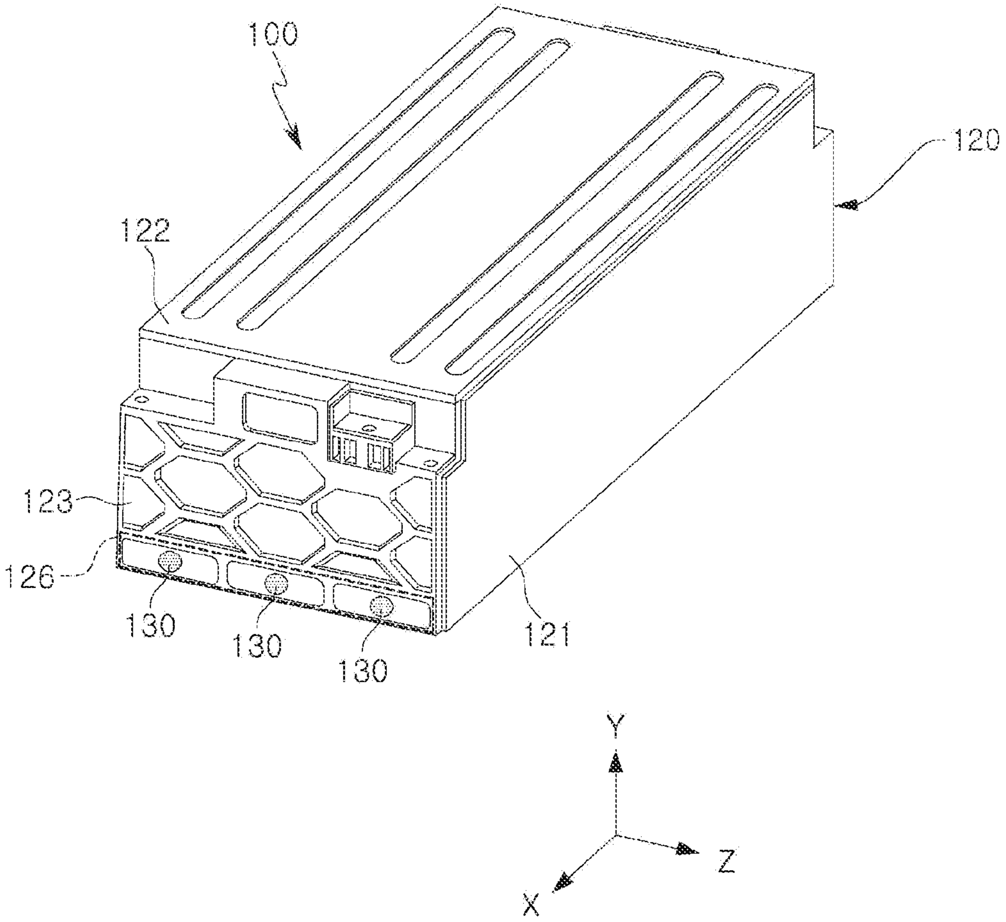
FIG. 1 is a perspective view of a battery module according to one exemplary embodiment.

First, general terms have been selected in consideration of functions in various exemplary embodiments of the present disclosure as terms used in the specification and the claims. However, these terms may be changed depending on an intention of those skilled in the art, legal or technical interpretation, the emergence of a new technology, and the like. Also, some terms are arbitrarily selected by the applicant. These terms may be interpreted as meanings defined in the present specification, and may be interpreted based on the general contents of the present specification and common technical knowledge in the art.

In addition, throughout the accompanying drawings of the specification, the same reference numerals denote parts or components performing substantially the same functions. For convenience of explanation and understanding, different exemplary embodiments will be described using the same reference numerals. That is, even though all the components having the same reference numerals are illustrated in a plurality of drawings, the plurality of drawings do not mean one exemplary embodiment.

In addition, in the specification and the claims, terms including ordinal numbers such as "first," "second," and the like may be used to distinguish between components. These ordinal numbers are used to distinguish the same or similar components from each other, and the meaning of the terms should not be restrictively construed by the use of these ordinal numbers. As an example, components combined with these ordinal numbers should not be limited in order of use or arrangement by the ordinal numbers. If necessary, the respectively ordinal numbers may be interchangeably used.

In the present specification, singular forms include plural forms unless the context clearly indicates otherwise. It should be understood that terms "comprise" or "include" used in the present specification, specify the presence of features, numerals, steps, operations, components, parts mentioned in the present specification, or combinations thereof, but do not preclude the presence or addition of one or more other features, numerals, steps, operations, components, parts, or combinations thereof.

Hereinafter, exemplary embodiments in the present disclosure will be described in detail with reference to the drawings. However, the spirit of the present disclosure is not limited to exemplary embodiments described herein.

For example, those skilled in the art understanding the spirit of the present disclosure will understand that other exemplary embodiments are included in the scope of the present disclosure by adding, changing, or deleting components, thereby which other exemplary embodiments are included in the scope of the present disclosure.

Figure 2:
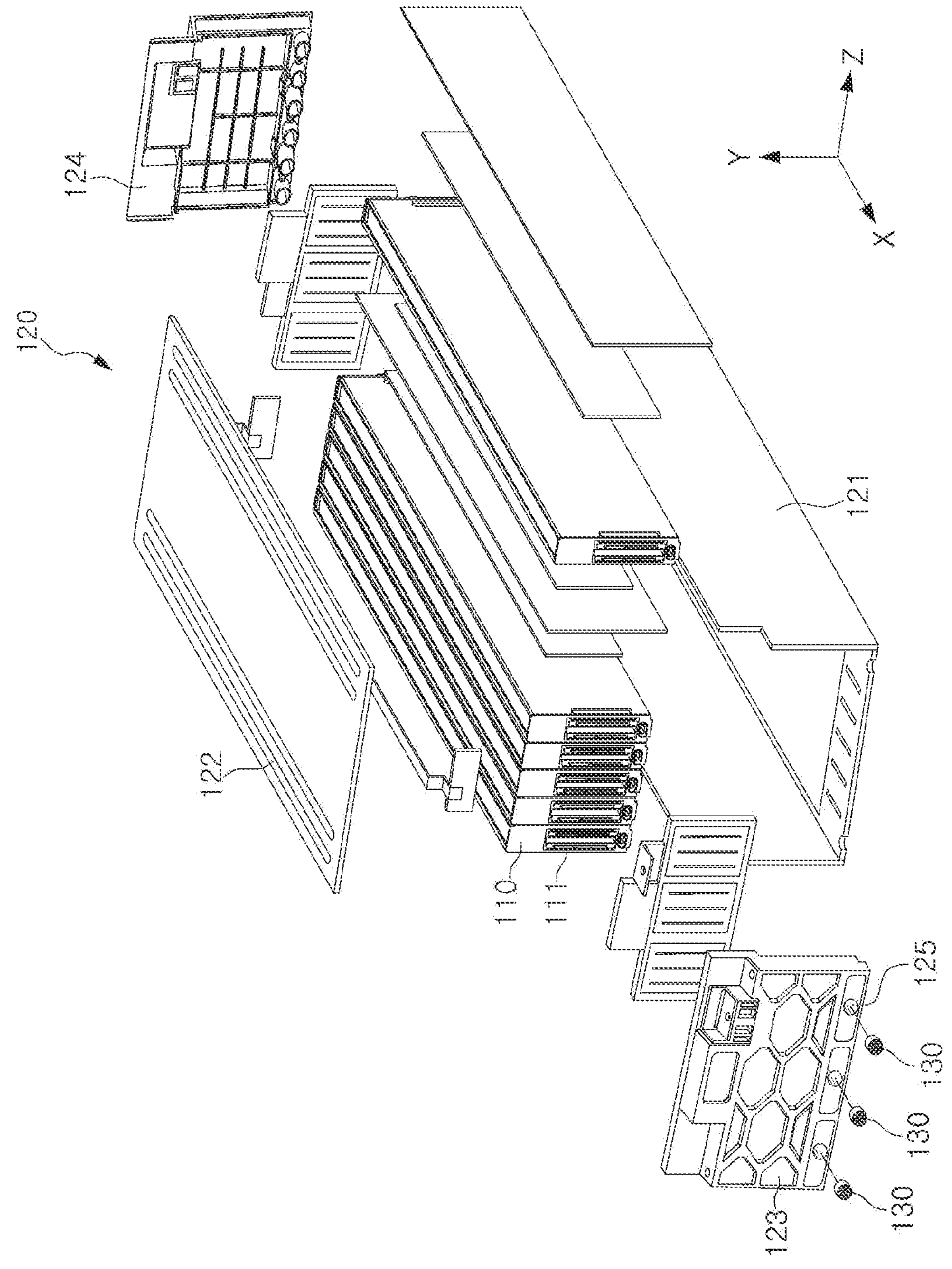
FIG. 2 is an exploded perspective view of the battery module according to the exemplary embodiment of FIG. 1.

FIG. 1 is a perspective view of a battery module 100 according to one exemplary embodiment. FIG. 2 is an exploded perspective view of the battery module 100 according to the exemplary embodiment of FIG. 1.

Referring to FIGS. 1 and 2, the battery module 100 includes a plurality of battery cells 110 and a case 120 accommodating the plurality of battery cells 110. The case 120 may include a lower case 121, an upper case 122, a front case 123, and a rear case 124. The shape and/or configuration of the case 120 shown in FIG. 1 and FIG. 2 is merely an example. In one embodiment, the case 120 may be provided in a form surrounding the plurality of battery cells 110.

In an exemplary embodiment, the battery module 100 may include a flame blocking member 130. The flame blocking member 130 may prevent/restrict a flame from being discharged to the other side of the case even if the flame enters one side thereof. In an exemplary embodiment, the flame blocking member 130 may be provided in one or more of lower case 121, upper case 122, front case 123, and rear case 124 of case 120. For example, the front case 123 may include a hole 125 connecting an inside and an outside thereof, and the flame blocking member 130 may be disposed in the hole 125.

In the illustrated embodiment shown in FIG. 2, a cross section of the flame blocking member 130 has a circular shape, and the flame blocking member 130 is disposed in three locations of the front case 123, but this is merely an example, and the present disclosure is not limited thereto. In another exemplary embodiment, the cross section of the flame blocking member 130 may have a polygonal shape. In another exemplary embodiment, the flame blocking member 130 may be disposed in one, two, or four or more locations of the front case 123.

In another exemplary embodiment, the cross section of the flame blocking member 130 may be provided in a rectangular shape having a length corresponding to a width of the front case 123. For example, referring to FIG. 1, the flame blocking member 130 may be provided to occupy the whole of rectangular area 126 extending in a width direction (i.e., a Z direction) of the front case 123. In this case, one or more holes 125 may also be provided in a shape corresponding to the rectangular area 126 thereby making rectangular area 126 into a flame blocking member panel.

In another exemplary embodiment, the flame blocking member 130 may be disposed on the rear case 124, and may be disposed on both the front case 123 and the rear case 124

In still another exemplary embodiment, the battery cell 110 may include an electrode lead 111 drawn out to one side. The electrode lead 111 is electrically connected to electrode plates inside the battery cell 110 through an electrode tab.

In one exemplary embodiment, the flame blocking member 130 may be disposed on a portion of the case 120 opposite to the electrode lead 111. In another exemplary embodiment, the flame blocking member 130 may be disposed in the direction in which the electrode lead 111 is drawn out. For example, the electrode lead 111 may be drawn out in a +X direction of the battery cell 110, and the flame blocking member 130 may be disposed on the front case 123 disposed in the +X direction of the electrode lead 111. The electrode lead 111 may be drawn out in a −X direction of the battery cell 110, and the flame blocking member 130 may be disposed on the rear case 124 disposed in the −X direction of the electrode lead 111. The gas or flame generated inside the electrode assembly may be guided to be ejected in the direction in which the electrode lead 111 is drawn out, and may reach the flame blocking member 130 disposed in the direction in which the electrode lead 111 is drawn out.

In the illustrated embodiment shown in FIG. 2, the flame blocking member 130 may be disposed on the front case 123, but this is merely an example, and in other exemplary embodiments, the flame blocking member 130 may be disposed at another portion. For example, the flame blocking member 130 may be disposed on the upper case 122. In this case, the gas generated inside the case 120 may be discharged to the upper portion.

Figure 3:
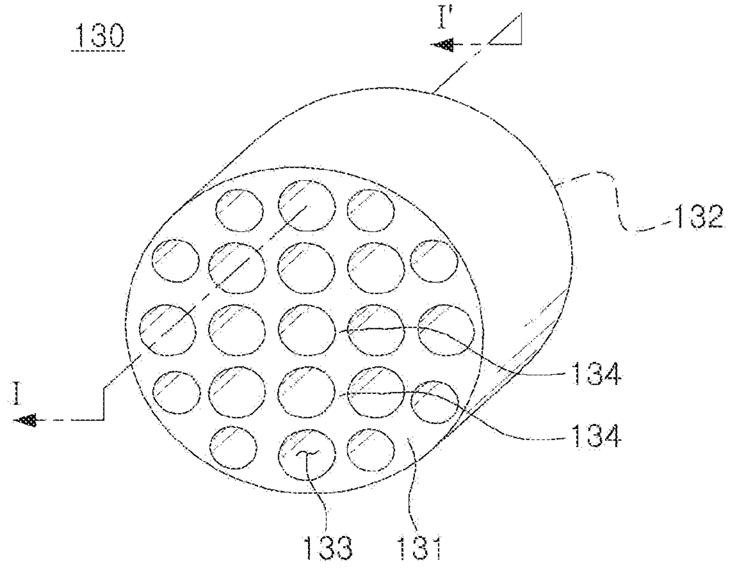
FIG. 3 is a diagram illustrating a flame blocking member of a circular cross section according to another exemplary embodiment.
Figure 4:
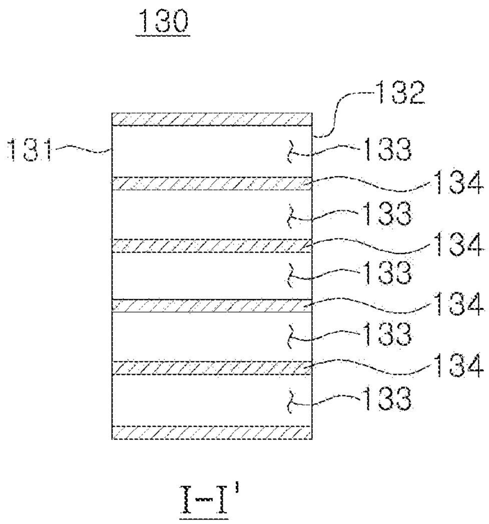
FIG. 4 is a cross-sectional view of the flame blocking member of FIG. 3.

FIG. 3 illustrates a disk-shaped flame blocking member 130 according to one exemplary embodiment. FIG. 4 is a cross-sectional view of the flame blocking member 130 of FIG. 3.

Referring to FIGS. 3 and 4, in one exemplary embodiment, the flame blocking member 130 may include an exhaust passage 133 extending from one surface 131 to the other surface 132. One surface 131 and the other surface 132 of the flame blocking member 130 may be spaced apart from each other in a thickness direction, and the exhaust passage 133 may extend in the thickness direction.

In the exemplary embodiment of FIG. 3, a plurality of exhaust passages 133 may be provided. For example, the flame blocking member 130 may have a thick circular cross-sectional shape, and a plurality of holes extending in the thickness direction may be provided as a cumulative exhaust passage 133. In this case, the plurality of holes may or may not communicate with each other.

In another exemplary embodiment, the flame blocking member 130 may have a thickness in a first direction, and the exhaust passage 133 and the partition wall part 134 may be provided in a form extending in the first direction.

In one exemplary embodiment, the exhaust passage 133 may have a cylindrical shape. However, this is merely an example, and in other exemplary embodiments, the exhaust passage 133 may have various shapes. For example, the exhaust passage 133 may have a square column shape. As another example, the exhaust passage 133 may have a hexagonal column shape.

In another exemplary embodiment, the flame blocking member 130 may include the partition wall part 134 disposed between the plurality of exhaust passages 133. In an exemplary embodiment, the cross section of the partition wall part 134 may define a hole corresponding to the exhaust passage 133, and the hole may define the exhaust passage 133 while extending in one direction.

In one exemplary embodiment, the partition wall part 134 includes partition walls extending from one surface 131 to the other surface 132, and the partition walls may be spaced apart from each other. In addition, a space surrounded by the partition walls may be provided as the exhaust passage 133 of the flame blocking member 130. For example, when the partition walls are disposed in a honeycomb shape, the exhaust passage 133 in a hexagonal column shape may be provided.

In another exemplary embodiment, the flame blocking member 130 may absorb thermal energy from flame or gas passing through the flame blocking member 130. For example, the gas flowing out through the exhaust passage 133 is cooled while passing through the partition wall part 134, and thus, the gas may be cooled to be equal to or lower than an ignition temperature.

In one exemplary embodiment, the flame blocking member 130 may be made of a material with high thermal conductivity. For example, the flame blocking member 130 may be made of a material having thermal conductivity of 5 W/mK or more. In one example, the flame blocking member 130 may include one or more metal materials such as brass, bronze, copper, SUS, and aluminum. In another exemplary embodiment, the flame blocking member 130 may include a fire-resistant material.

As the flame or gas passes through exhaust passages 133 in the partition wall part 134, thermal energy is dissipated, and the flame may be extinguished before being ejected to the outside of the battery module 100, or otherwise the temperature of the gas may be lowered before being ejected to the outside of the battery module 100.

According to one exemplary embodiment, even if a fire occurs in a specific battery module 100, the transfer of the fire to neighboring battery modules 100 may be prevented or minimized. In the case of a battery pack 1000 including the plurality of battery modules 100 therein, the flame blocking member 130 may prevent a situation in which other battery modules are ignited due to the fire occurring in the battery module 100, or may minimize the occurrence of the situation of other battery modules being ignited due to a fire occurring with one battery module.

In one embodiment, the flame blocking member 130 may be composed of a) a partition wall part having an outside shape conformed to an opening which vents flame gas from a battery module when a battery in the battery module catches fire, and b) a plurality of exhaust passages in the partition wall part extending longitudinally and completely through the partition wall part In thus embodiment, plural flame blocking members can be disposed across the above-noted rectangular area 126 (shown in FIG. 1) to form the above-noted flame blocking member panel.

Figure 5:
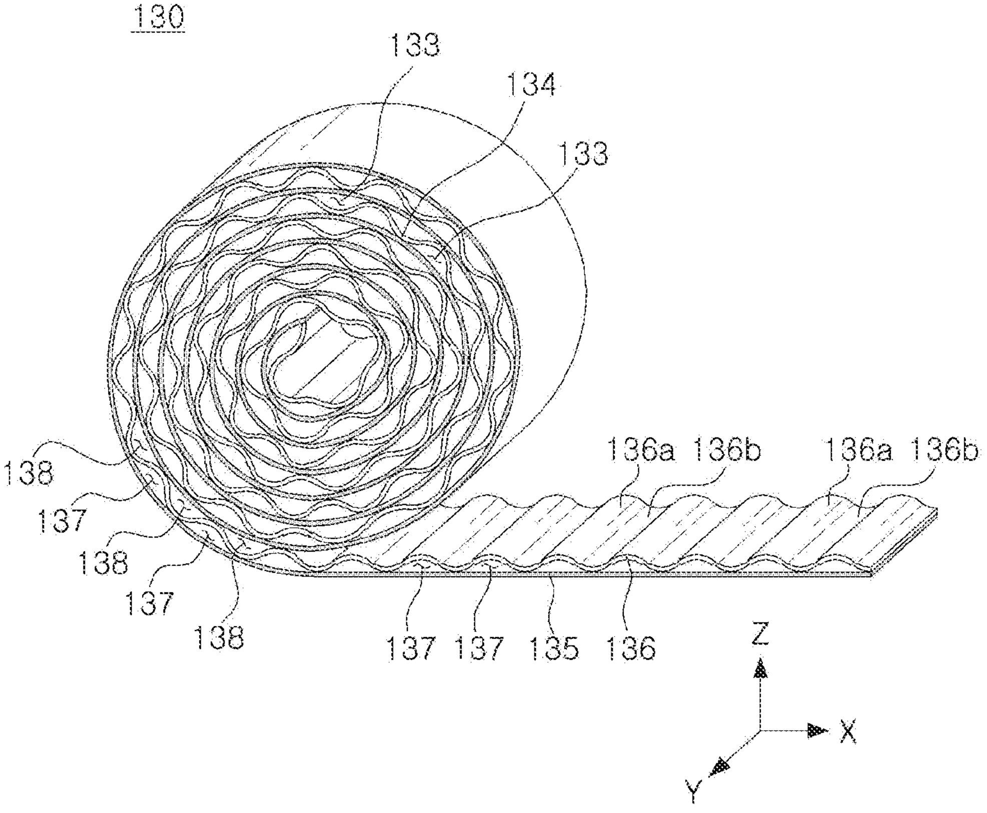
FIG. 5 is a diagram illustrating a flame blocking member having a form of corrugated board according to still another exemplary embodiment.

FIG. 5 illustrates a flame blocking member 130 having a form of corrugated board in one exemplary embodiment. FIG. 5 illustrates a flame blocking member 130 according to an exemplary embodiment different from FIG. 3.

In the exemplary embodiment of FIG. 5, the flame blocking member 130 includes sheet members in the form of corrugated board, and the exhaust passage 133 may be defined by a space formed between the sheet members. Referring to FIG. 5, in this exemplary embodiment, the flame blocking member 130 may include a first sheet member 135 and a second sheet member 136 disposed on the first sheet member 135.

The space formed between the first sheet member 135 and the second sheet member 136 may constitute at least a part of the exhaust passage 133 of the flame blocking member 130. In this exemplary embodiment, the first sheet member 135 and/or the second sheet member 136 may be configured such that air gaps 137 and 138 are formed between the first sheet member 135 and the second sheet member 136. For example, the first sheet member 135 may be provided in the form of a flat strip extending in the longitudinal direction, and the second sheet member 136 may be provided in the form of a strip extending convexly in the longitudinal direction.

When the first sheet member 135 and the second sheet member 136 are wound together in a state in which the second sheet member 136 is disposed on the first sheet member 135, finally, the flame blocking member 130 having a circular cross-section having a predetermined thickness may be made. In this case, the air gaps 137 and 138 between the first sheet member 135 and the second sheet member 136 constitute the exhaust passage 133 of the flame blocking member 130. In addition, the first sheet member 135 and the second sheet member 136 constitute the partition wall part 134. FIG. 5 illustrates a form in which a portion of the sheet members 135 and 136 are unwound for convenience of explanation, and in fact, the unwound portion is also provided in the wound state.

In one exemplary embodiment, the exhaust passage 133 extending from the inside to the outside of the case 120 may be formed between the sheet members 135 and 136. For example, the exhaust passage 133 may include the air gaps 137 and 138 formed between the first sheet member 135 and the second sheet member 136. The air gaps 137 and 138 may extend in a direction crossing the longitudinal direction of the sheet members 135 and 136. In the present disclosure, the longitudinal direction refers to a direction in which long sides of the sheet members 135 and 136 extend. Referring to FIG. 5, the sheet members 135 and 136 extend in the X direction, and the air gaps 137 and 138 extend in a direction perpendicular to the longitudinal direction (i.e., Y direction). Although not illustrated, as another example, the air gaps 137 and 138 may extend at an angle greater than 0° and less than 180° with respect to the longitudinal direction.

In the illustrated embodiment shown in FIG. 5, the air gaps 137 and 138 or the exhaust passage 133 extend in a straight line, but this is merely an example, and the exhaust passage 133 may extend from one surface 131 to the other surface 132 of the flame blocking member 130. For example, the exhaust passage 133 may extend along a curved line or a bent line.

In the present disclosure, the exhaust passage 133 of the flame blocking member 130 does not communicate with other exhaust passages, but this is merely an example, and the exemplary embodiment in the present disclosure is not limited thereto. In another exemplary embodiment, the exhaust passage 133 may communicate with other exhaust passages. For example, a through hole may be provided in a partition wall disposed between the first exhaust passage and the second exhaust passage, and the first exhaust passage and the second exhaust passage may communicate with each other through the through hole.

In one exemplary embodiment, the second sheet member 136 may include uneven portions arranged in the longitudinal direction. When the first sheet member 135 is provided in the form of a flat strip, the air gaps 137 and 138 may be formed between the first sheet member 135 and the second sheet member 136 due to the uneven portion of the second sheet member 136.

In another exemplary embodiment, the second sheet member 136 may include a plurality of ridges **136*a* and a plurality of valleys 136*b* extending in a direction crossing the longitudinal direction. The plurality of ridges 136*a* and the plurality of valleys 136*b* are alternately disposed in the longitudinal direction of the second sheet member 136. When the first sheet member 135 and the second sheet member 136 are in contact with each other, the air gaps 137 and 138 may be formed between the plurality of valleys 136*b* and the plurality of ridges 136*a***.

In the illustrated embodiment shown in FIG. 5, the second sheet member 136 includes the uneven portion in the form of a sine wave, but this is merely an example, and the form of the uneven portion may be provided variously. For example, the uneven portion may have a square wave shape or a triangular wave shape.

In the illustrated embodiment shown in FIG. 5, the sheet members 135 and 136 may be wound in a circular shape, but this is merely an example, and in other exemplary embodiments, the sheet members 135 and 136 may be wound in various shapes. For example, the sheet members 135 and 136 may be wound in a track shape or a squared shape.

Figure 6:
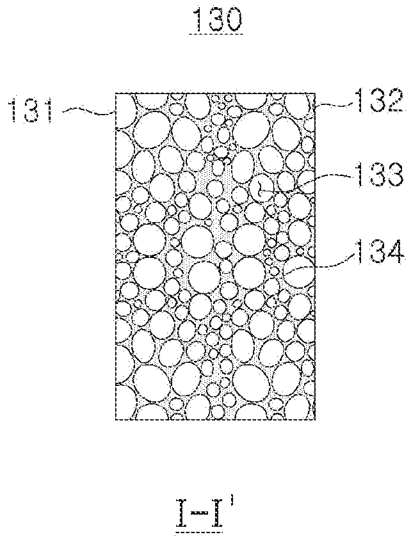
FIG. 6 is a cross-sectional view of a flame blocking member including irregular holes in according to yet another exemplary embodiment.
Figure 7:
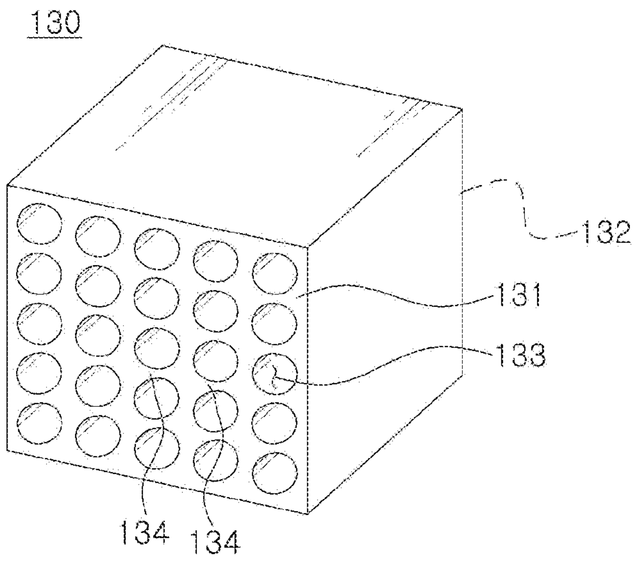
FIG. 7 is a diagram illustrating a flame blocking member of a squared cross section in another exemplary embodiment.

FIG. 6 is a cross-sectional view of a flame blocking member 130 including irregular holes according to another exemplary embodiment. FIG. 6 illustrates a flame blocking member 130 according to an exemplary embodiment different from FIG. 3. FIG. 7 shows a squared flame blocking member 130 according to still another exemplary embodiment.

Referring to FIG. 6, in an exemplary embodiment, the flame blocking member 130 may include irregular holes. For example, the flame blocking member 130 may have a structure similar to a sponge including numerous holes therein. The irregular holes form the exhaust passage inside the flame blocking member 130. The irregular holes formed inside the flame blocking member 130 communicate with each other, and air entering the inside from one surface 131 of the flame blocking member 130 may exit to the other surface 132 while passing through the irregular holes. The flame or gas introduced from one side of the flame blocking member 130 into the flame blocking member 130 may be dissipated, extinguished, and/or cooled while passing through the numerous holes.

Referring to FIG. 7, in this exemplary embodiment, the flame blocking member 130 may have a squared appearance.

In another exemplary embodiment, the exhaust passage 133 of the flame blocking member 130 may be configured in a combination of the forms described in FIGS. 3 to 6. For example, a portion of the exhaust passage 133 may be provided in the form of corrugated board as illustrated in FIG. 5, and a portion thereof may be provided in the form of an irregular hole as illustrated in FIG. 6.

Figure 8:
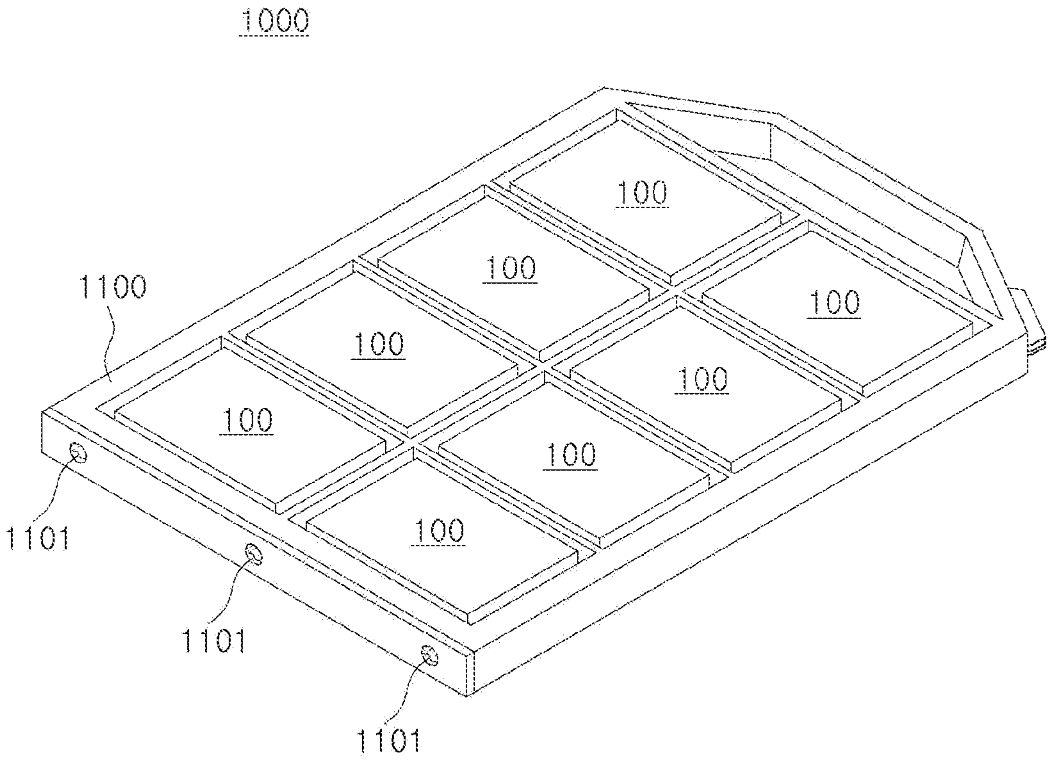
FIG. 8 is a diagram illustrating a battery pack according to still another exemplary embodiment.
Figure 9:
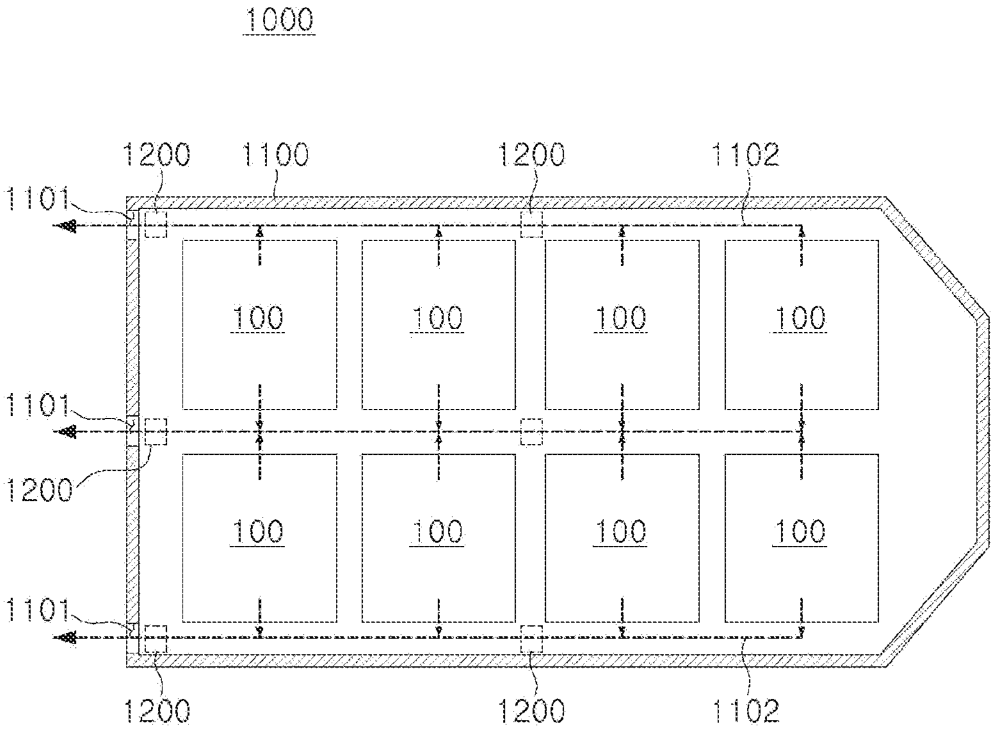
FIG. 9 is a diagram illustrating an internal air flow path of the battery pack according to yet another exemplary embodiment.

FIG. 8 illustrates an internal structure of a battery pack 1000 according to one exemplary embodiment. FIG. 9 illustrates an internal air flow path of the battery pack 1000 according to this exemplary embodiment.

Referring to FIG. 8, the battery pack 1000 includes a pack case 1100 and battery modules 100 disposed inside the pack case 1100.

In this exemplary embodiment, the pack case 1100 may include a vent hole 1101 for discharging flame or gas generated inside the case 120 to the outside. In the illustrated exemplary embodiment, three circular vent holes 1101 are provided in the pack case 1100, but this is merely an example, and in other exemplary embodiments, the cross-sectional shape, disposition position, number, arrangement, etc., of the vent holes 1101 may be provided variously.

Referring to FIG. 9, the battery pack 1000 may include a flow path 1102 therein. The flow path 1102 may be connected to the vent hole 1101. The flame or gas discharged from the battery module 100 may be guided to the vent hole 1101 through the flow path 1102, and finally discharged to the outside of the pack case 1100. In this case, when the flame is ejected to the outside of the pack case 1100 or the temperature of the ejected gas is very high, the battery pack 1000 and neighboring components may be damaged.

In one exemplary embodiment, the battery pack 1000 includes a flame blocking member 1200 disposed in the internal flow path 1102, and the flame blocking member 1200 may prevent/restrict the flame or high-temperature gas from being ejected to the outside of the pack or minimize the ejection of the flame or high-temperature gas. The features of the flame blocking member 1200 are the same as those of the flame blocking member 130 described in FIGS. 3 to 7, and overlapping contents will be omitted.

In another exemplary embodiment, the flame blocking member 1200 may be disposed anywhere in the movement path of the flame or gas generated inside the battery pack 1000. For example, the flame blocking member 1200 may be disposed inside the vent hole 1101. As another example, the flame blocking member 1200 may be disposed on one side of the vent hole 1101. As another example, the flame blocking member 1200 may be disposed adjacent to a portion from which the gas and flame exit from the battery module 100. For example, the battery module 100 may include a vent hole (e.g., the hole 125 in FIG. 2) for ejecting gas, and the flame blocking member 1200 may be attached to a vent hole provided in the battery module 100.

In one exemplary embodiment, the plurality of flame blocking members 1200 may be disposed on the flow path 1102.

The shape of the pack case 1100 and the arrangement of the battery modules 100 in FIGS. 8 and 9 are merely examples, and the present disclosure is not limited thereto.

According to one exemplary embodiment in the present disclosure, it is possible to provide a battery module capable of preventing/restricting flame or high-temperature gas generated inside the battery module from being ejected to an outside of the battery module or capable of minimizing the flame or high-temperature gas ejected.

According to one exemplary embodiment in the present disclosure, it is possible to provide a battery pack capable of preventing/restricting flame or high-temperature gas generated inside the battery pack from being ejected to an outside of the battery pack or capable of minimizing the flame or high-temperature gas ejected.

While exemplary embodiments have been shown and described above, it will be apparent to those skilled in the art that modifications and variations could be made without departing from the scope of the present disclosure as defined by the appended claims.

What is claimed is:

1. A battery module, comprising:

a case including a front case, a rear case opposing the front case, an upper case, and a lower case opposing the upper case;

a battery stack including a plurality of battery cells stacking in a first direction, the battery stack is accommodated in the case, and each of the plurality of battery cells includes a first electrode lead protruding in a second direction toward the front case, and a second electrode lead protruding in the second direction toward the rear case, wherein the first and second directions are perpendicular to each other; and a plurality of flame blocking members, each of the plurality of flame blocking members includes a plurality of exhaust passages connecting an inside and an outside of the case together, and a partition wall part disposed between the plurality of exhaust passages, wherein the plurality of flame blocking members is disposed along the first direction on the front case and along the first direction on the rear case and facing the second direction, wherein the lower case includes a bottom surface supporting the plurality of battery cells, and side surfaces facing each other in the first direction and covering lateral sides of the battery stack, and wherein the each of the plurality of flame blocking members includes a first portion including a sponge having irregular holes constituting at least a first portion of the plurality of exhaust passages, and a second portion including sheet members having a corrugated form, and a second portion of the plurality of exhaust passages are defined by spaces formed between the sheet members, and wherein each of the plurality of flame blocking member includes a material having a thermal conductivity of 5 W/mK or more.

2. The battery module of claim 1, wherein the plurality of flame blocking members has a thickness in the second direction, and the plurality of exhaust passages and the partition wall part extend in the second direction.

3. The battery module of claim 1, wherein the second portion of each of the plurality of flame blocking members has a shape in which a first sheet member and a second sheet member disposed on the first sheet member are wound, and the second portion of the plurality of exhaust passages include spaces formed between the first sheet member and the second sheet member, and the partition wall part includes the first sheet member and the second sheet member.

4. The battery module of claim 3, wherein the first sheet member is flat, and the second sheet member includes a plurality of uneven portions.

5. The battery module of claim 3, wherein the second sheet member has a form in which a plurality of valleys and a plurality of ridges are alternately arranged.

6. A battery pack, comprising:

a pack case;

the battery module of claim 1 accommodated in the pack case; and a pack flame blocking member including a plurality of pack exhaust passages connecting an inside and an outside of the pack case together, and a partition wall part disposed between the plurality of pack exhaust passages.

7. The battery pack of claim 6, wherein the pack flame blocking member has a thickness in a first direction, and the plurality of pack exhaust passages and the partition wall part extend in the first direction.

8. The battery pack of claim 6, wherein the pack flame blocking member includes sheet members having a corrugated form, and the plurality of pack exhaust passages are defined by spaces formed between the sheet members.

9. The battery pack of claim 6, wherein the pack flame blocking member has a shape in which a first sheet member and a second sheet member disposed on the first sheet member are wound, and the plurality of pack exhaust passages include spaces formed between the first sheet member and the second sheet member, and the partition wall part includes the first sheet member and the second sheet member.

10. The battery pack of claim 9, wherein the first sheet member is flat, and the second sheet member includes a plurality of uneven portions.

11. The battery pack of claim 9, wherein the second sheet member has a form in which a plurality of valleys and a plurality of ridges are alternately arranged.

12. The battery pack of claim 6, wherein the pack case includes a pack vent hole connecting the inside and outside of the pack case, and the pack flame blocking member is disposed inside or on one side of the pack vent hole.

13. The battery pack of claim 6, wherein the pack case includes a pack vent hole connecting the inside and outside of the pack case, a flow path connected to the pack vent hole is formed inside the pack case, and the pack flame blocking member is disposed on at least one location on the flow path.

14. The battery pack of claim 6, wherein the pack flame blocking member includes irregular holes, and the irregular holes constitute at least a portion of the plurality of pack exhaust passages.

15. The battery pack of claim 6, wherein the pack flame blocking member includes a material having a thermal conductivity of 5 W/mK or more.

16. The battery module of claim 1, wherein the plurality of flame blocking members is disposed at a lower level than the first electrode lead and the second electrode lead.

17. The battery module of claim 1, wherein the plurality of flame blocking members is disposed on a lower portion of the front case and the rear case.

18. The battery module of claim 1, wherein each of the front and rear cases includes holes therethrough, and the plurality of flame blocking members are disposed inside the holes.

* * * * *